6362X
E. Stienhauer,
Cook Stove.
Patented Feb. 3, 1831.
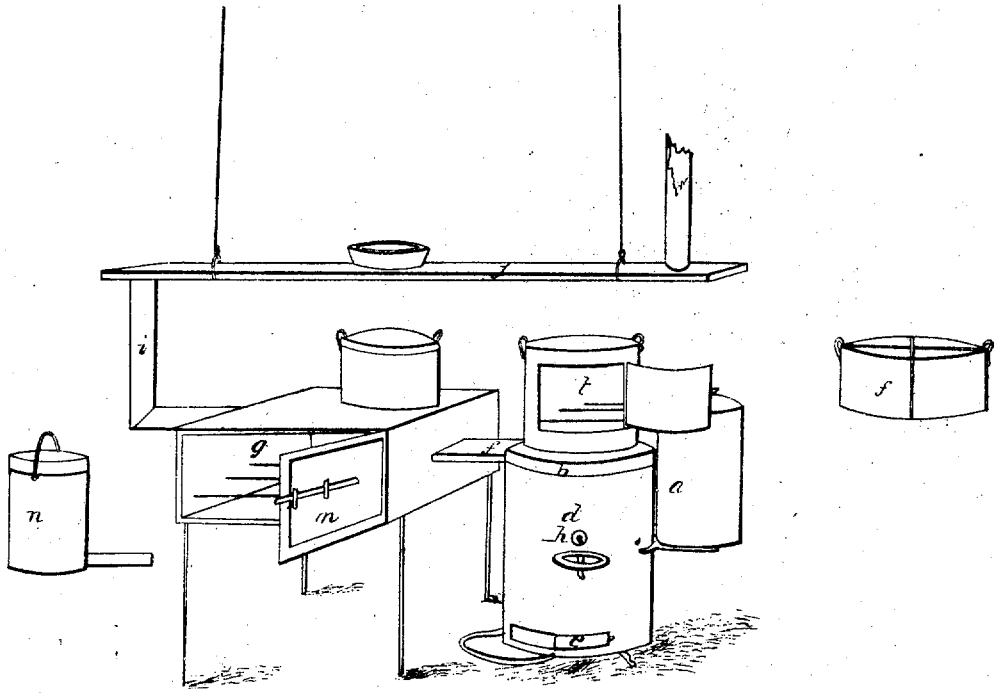

Feb 3, 1831

6362X Emma Steinhauer, A Citizen of

Letters Patent.

The Schedule referred to in these Letters Patent and making part of the same, containing a description in the words of the said Emma Steinhauer, herself of her improvement upon the cylindrical Sheet iron Stove used in the burning of Anthracite by appropriating the heated air thereof after it has passed through the body of the fire, to the purposes of cooking.

The improvement consists of a cylindrical sheet iron stove, lined with fire proof clay, represented in the drawing annexed hereto by the letter d) at the bottom of which is a small door opened for the admission of the air necessary for combustion, (represented at the letter e) The stove may be surrounded by one, two, three, or more boilers, each of which (as represented at the letter a) is supported by a projecting rivet attached to the body of the stove, and has a circular tube communicating with the interior of the boiler near to its bottom (as represented by the detached boiler at letter H,) which entering the centre of the fire through an aperture, (which aperture is to be closed when the boiler is removed) causes the water therein to boil with great rapidity. At or near the top of the cylindrical stove above mentioned, is a flue as designated by letter f for the carrying the heated air out of the stove into the roaster with which it communicates. The roaster (designated by the letter g) is an oblong box or chamber of sheet iron, of any required dimensions with a door (as shown at the letter M) in front in the interior of which are iron bars for supporting dripping pans &c. Of these bars there may be two tiers by which means baking and roasting may be performed at the same time. To this roaster is attached an ascending pipe (as seen at the letter i,) which carries off the heated air through into a flattened pipe (as shown at the letter j) extending horizontally

[illegible]

63622X Feb 3, 1831 horizontally as far as may be requisite, in which may be placed dishes plates &c for the purpose of warming, at the termination of which is another ascending pipe ending the whole construc-tion. On the top of the cylindrical stove also, is a moveable sheet iron cover (as seen at letter b) which, when taken off may be replaced by two different culinary articles, the first of which is a sheet iron oven (as seen at letter c) in which baking may be performed at the same time that roasting is carried on in the roaster, and boiler — fixed around the stove. The second of these articles, to be put upon the top of the stove, in the place of the moveable cover consists of four tin vessels in the form of Quadrants fitting together, so as to form a cover to the stove (as seen at the letter d) in which four kinds of vegetables may be boiled at the same time.

What the inventor claims as new and her own invention in the above described cooking stove, is, The mode of roasting by means of the heated air after it has passed thro' the body of the fire, and at the same time of boiling at the sides, and baking on the top of the stove & at the same time of roasting and baking and baking in the heated air that passes of behind the stove; or of roasting & baking in the heated air behind the stove, boiling at the sides of the stove, and at the same time of leaving the top of the stove open for heating flat irons, broiling, frying, and a variety of culinary operations Exd. W.H.

Witnesses
A. H. Richards
[illegible] E. Richards

Emma [illegible]

612 [illegible]